United States Patent
Yang et al.

(10) Patent No.: US 9,479,356 B2
(45) Date of Patent: Oct. 25, 2016

(54) DVPN LARGE-SCALE NETWORKING AND SPOKE

(71) Applicant: Hangzhou H3C Technologies Co., Ltd., Hangzhou (CN)

(72) Inventors: Yinzhu Yang, Beijing (CN); Zhanqun Wang, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 49 days.

(21) Appl. No.: 14/372,735

(22) PCT Filed: Dec. 13, 2012

(86) PCT No.: PCT/CN2012/086489
§ 371 (c)(1),
(2) Date: Jul. 16, 2014

(87) PCT Pub. No.: WO2013/120377
PCT Pub. Date: Aug. 22, 2013

(65) Prior Publication Data
US 2014/0369349 A1    Dec. 18, 2014

(30) Foreign Application Priority Data

Feb. 15, 2012 (CN) ............ 2012 1 0033621

(51) Int. Cl.
*H04L 12/715* (2013.01)
*H04L 12/46* (2006.01)

(52) U.S. Cl.
CPC ......... *H04L 12/4633* (2013.01); *H04L 45/04* (2013.01)

(58) Field of Classification Search
None
See application file for complete search history.

(56) References Cited

U.S. PATENT DOCUMENTS

| | | | | |
|---|---|---|---|---|
| 7,447,901 B1* | 11/2008 | Sullenberger | ....... | H04L 63/0272 713/153 |
| 7,801,030 B1* | 9/2010 | Aggarwal | ............... | H04L 12/44 370/227 |
| 2005/0025069 A1* | 2/2005 | Aysan | ................. | H04L 12/4641 370/254 |
| 2005/0188106 A1* | 8/2005 | Pirbhai | ................... | H04L 45/54 709/238 |
| 2006/0182037 A1* | 8/2006 | Chen | .................... | H04L 12/4641 370/252 |
| 2006/0215578 A1* | 9/2006 | Andrapalliyal | ..... | H04L 12/4679 370/254 |
| 2007/0058638 A1* | 3/2007 | Guichard | ............ | H04L 12/4641 370/395.31 |
| 2007/0206597 A1* | 9/2007 | Asati | ................... | H04L 12/4633 370/392 |
| 2008/0172732 A1* | 7/2008 | Li | ....................... | H04L 12/4641 726/15 |
| 2009/0097417 A1 | 4/2009 | Asati et al. | | |
| 2009/0296714 A1* | 12/2009 | Gerber | ................ | H04L 12/4641 370/395.31 |
| 2010/0142410 A1* | 6/2010 | Huynh Van | ......... | H04L 12/4633 370/255 |

FOREIGN PATENT DOCUMENTS

| CN | 101252509 | 8/2008 |
|---|---|---|
| CN | 102546434 | 7/2012 |

OTHER PUBLICATIONS

International Search Report and Written Opinion dated Mar. 21, 2013 issued on PCT Patent Application No. PCT/CN2012/086489 filed on Dec. 13, 2012, The State Intellectual Property Office, the P.R. China.

* cited by examiner

*Primary Examiner* — Ayaz Sheikh
*Assistant Examiner* — Tarell Hampton
(74) *Attorney, Agent, or Firm* — Hewlett Packard Enterprise Patent Department

(57) ABSTRACT

According to an example a Dynamic Virtual Private Network (D-VPN) large-scale networking method includes establishing, by a Spoke, a DVPN channel with a Hub; issuing, by the Spoke, subnet information about the Spoke to the Hub; and obtaining, by the Spoke, subnet information about the Hub and another Spoke as well as corresponding private network address of a next hop sent by the Hub.

13 Claims, 4 Drawing Sheets

DVPN LARGE-SCALE NETWORKING AND SPOKE

CLAIM FOR PRIORITY

The present application is a national stage filing under 35 U.S.C 371 of PCT application number PCT/CN2012/086489, having an international filing date of Dec. 13, 2012, which claims priority of China application number 201210033621.0 having a filing date of Feb. 15, 2012, the disclosure of which is hereby incorporated by reference in its entirety.

BACKGROUND

More and more enterprises put forward higher requirements for establishing a Virtual Private Network (VPN) utilizing a public network. However, in many cases, an enterprise branch may access a public network with a dynamic address. Thus, a public network address of peer end cannot be learned in advance. Subsequently, it is difficult to establish a direct exchange channel among each branch.

BRIEF DESCRIPTIONS OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

A DVPN solution may be formed by two parts, that is, VPN Address Management (VAM) protocol and dynamic point-to-multipoint channel. VAM protocol, which is taken as main protocol in the DVPN solution, is in charge of collecting, maintaining, distributing information, such as public network address, to facilitate a user to establish an internal security channel quickly and conveniently. A private network address of a next hop about a data packet, which is forwarded among enterprise internal subnets, may be obtained with a routing protocol. The public network address corresponding to the private network address of the next hop about the above data packet may be obtained with the VAM protocol. The above data packet may be encapsulated with the public network address as channel destination address. Subsequently, the encapsulated data packet may be submitted to the established security channel and sent to a destination user.

Each client, e.g., each Hub and each Spoke, may register a corresponding relationship between public network address and private network address of itself to a server. After a current client registers successfully to the server, other clients may query the public network address about the current client from the server, so as to establish a DVPN channel among clients. Message transmission between sever and client may be implemented with the VAM protocol. Establishment, maintenance and deletion of channel among clients may be implemented with the DVPN channel protocol.

Networking type of the DVPN includes star topology Hub-Spoke and mesh topology Full-Mesh. Specifically speaking, the networking type may be configured on the VAM server. After registering to the VAM server by the Hub, the VAM server may issue the configured networking type to the Hub. Alternatively, the networking type may be directly configured on the Hub.

Figure 4:
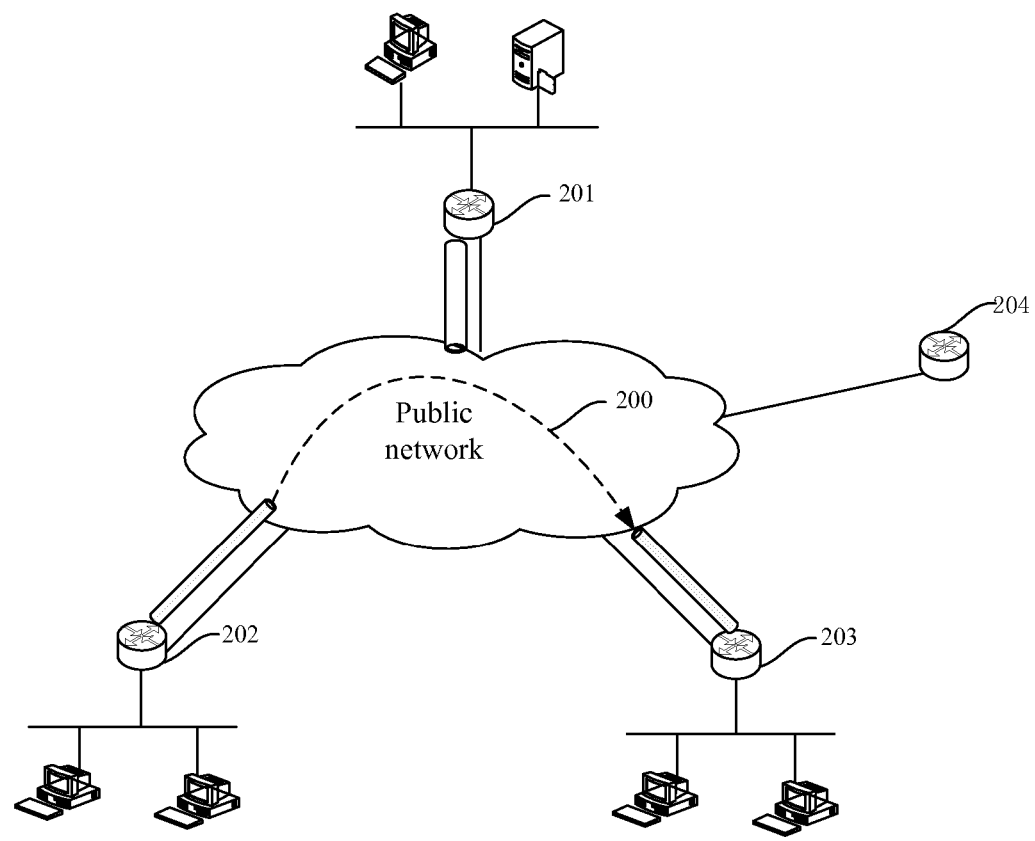
FIG. 4 is a schematic diagram illustrating a networking structure of the DVPN, when networking type is Full-Mesh, according to an example of the present disclosure.

With reference to FIG. 4, FIG. 4 is a schematic diagram illustrating a networking structure of the DVPN, when networking type is Full-Mesh, according to an example of the present disclosure. The networking structure in FIG. 4 includes Hub 201, Spoke 202, Spoke 203 and VAM server 204. Hub 201, Spoke 202, Spoke 203 and VAM server 204 may be connected with each other via a public network. Each of Hub 201, Spoke 202, Spoke 203 connects with a private network. When registering to the VAM server 204, each of Hub 201, Spoke 202 and Spoke 203 may carry respective private network gateway address and public network address. After registering successfully, each client may search out public network address of each of other clients from the VAM server 204. Subsequently, each client may establish a DVPN channel between or among clients via the public network, according to the public network address. In the Full-Mesh networking illustrated in FIG. 4, each Spoke has established a DVPN channel with the Hub. Meanwhile, a channel may also be established between Spokes. Thus, the flow destined for Spoke 203 from Spoke 202, may be directly sent to Spoke 203, via the DVPN channel between Spoke 202 and Spoke 203.

Figure 5:
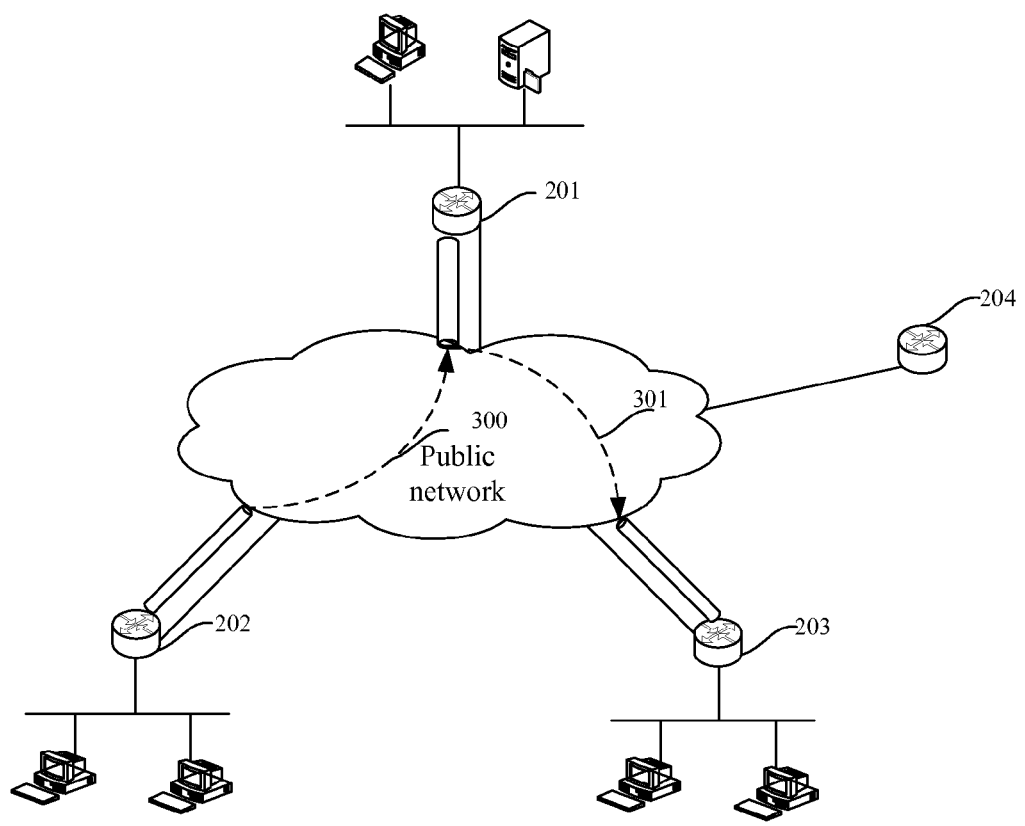
FIG. 5 is a schematic diagram illustrating a networking structure of the DVPN, when networking type is Hub-Spoke, according to an example of the present disclosure.

FIG. 5 is a schematic diagram illustrating a networking structure of the DVPN, when networking type is Hub-Spoke, according to an example of the present disclosure. The networking structure shown in FIG. 5 includes Hub 201, Spoke 202, Spoke 203 and VAM server 204, similar to that shown in FIG. 4. The differences between FIG. 5 and FIG. 4 are as follows. In the Hub-Spoke networking structure, each Spoke has established a DVPN channel with the Hub. Generally speaking, there is no channel established between Spokes. Thus, the flow destined for Spoke 203 from Spoke 202, may generally be sent to Hub 201, via DVPN channel 300 between Spoke 202 and Hub 201, and then be sent to Spoke 203 via DVPN channel 301 between Hub 201 and Spoke 203.

In the foregoing DVPN technical solution, subnet routing and next hop address of a client may be released with a dynamic routing protocol. After registering to a VAM server successfully, Spoke establishes a permanent DVPN channel with Hub, to learn and release routings. Hub, which is taken as a central node of routing, is in charge of collecting subnet routing information about all of the Spokes, and then releasing to each Spoke. Thus, when there is data flow to be forwarded among Spokes, local routing information may be queried, so as to obtain next hop address of the routing, and to query public network address of peer end from the VAM server.

In the above technical solution, the Hub establishes a routing neighbor with each Spoke. In a large-scale networking, the Hub end maintains a large number of routing neighbors and routing information. Thus, system overhead is large. Routing configuration is complex, and is restricted by specification of dynamic routing protocol.

In a method of DVPN large-scale networking, which is put forward by the present disclosure, each Hub and each Spoke in the networking may register to a VAM server. The VAM server may issue Hub information within a domain to each Spoke.

A Spoke may establish a DVPN channel with a corresponding Hub, according to the Hub information issued by the VAM server. The Spoke may send subnet information of the Spoke to the Hub, to enable the Hub to generate subnet routing to the Spoke. The Spoke may receive subnet information about the Hub and another Spoke, as well as corresponding private network address of next hop sent by the Hub, and generate subnet routing information about the Hub and other Spoke. The above subnet information about the other Spoke is obtained by the Hub.

The generated subnet routing information about the Hub includes subnet information and private network address about the Hub. The subnet routing information about the other Spoke includes subnet information about other Spoke, and the corresponding private network address of next hop received. When the current networking type is star topology Hub-Spoke, that is, a DVPN channel may only be established between a Hub and a Spoke, the private network address of the next hop corresponding to the subnet network about other Spoke is a private network address of the Hub. When the current networking type is mesh topology Full-Mesh, that is, a DVPN channel may not only be established between a Hub and a Spoke, but also be established between Spokes according to requirements, the private network address of the next hop corresponding to the subnet information about other Spoke is a private network address of the other Spoke.

Networking type may be configured in the VAM server. After the Hub registers to the VAM server, the VAM server may issue the configured networking type to the Hub. The networking type may also be directly configured in the Hub. When sending the subnet information about the other Spoke and corresponding private network address of the next hop to each Spoke, the Hub may determine whether the private network address sent out corresponds to the Spoke or the Hub, according to current networking type.

When the subnet information about the Spoke changes, the Hub may be informed about the subnet information changed via the established DVPN channel. Subsequently, the Hub may be enabled to inform all of the other Spokes, each of which has established a DVPN channel with the Hub, to change the subnet information about the Spoke.

When the Spoke is off line, the Spoke may delete routing information generated by the Spoke, and inform Hub with which the DVPN channel is established, to remove corresponding DVPN channel. Subsequently, the Hub may be enabled to delete corresponding routing information, and to inform all of the other Spokes, each of which has established a DVPN channel with the Hub, to delete corresponding routing information. The DVPN channel established by the Hub may also be removed.

When the subnet information about the Spoke changes, the Spoke may inform the Hub about the subnet information changed, to enable the Hub to re-generate subnet routing information to the Spoke, according to the subnet information about the Spoke. The Hub may also be enabled to inform all of the other Spokes, each of which has established a DVPN channel with the Hub, current subnet information about the Spoke, and corresponding private network address of a next hop.

When the Spoke has established a DVPN channel with another Spoke, and the subnet information about the Spoke changes, the Spoke informs the Hub and the another Spoke with which a DVPN channel is respectively established, about the subnet information changed via respective DVPN channel, and enables the Hub to inform all of the other Spokes, each of which has established a DVPN channel with the Hub, to change the subnet information about the Spoke.

When the Spoke has established a DVPN channel with another Spoke, and when the Spoke is off line, the Spoke deletes routing information generated locally, informs the Hub and the another Spoke with which a DVPN channel is respectively established, to remove the corresponding DVPN channel, enables the Hub to delete corresponding routing information and to inform all of the other Spokes, each of which has established a DVPN channel with the Hub, to delete the corresponding routing information, and removes the DVPN channel established locally by the Spoke.

When receiving a notification to remove the DVPN channel sent by the Hub, the Spoke may delete routing information generated by the Spoke and the DVPN channel, and try again to establish a DVPN channel with the Hub, until the VAM server informs that the Hub is off line.

When receiving a notification to remove the DVPN channel sent by the Hub, the Spoke may firstly delete the generated routing information and the DVPN channel. However, the Spoke may continue and take the initiative to establish a DVPN channel with the Hub. Since the Spoke cannot determine whether the Hub is malfunctioning or off line, the Spoke may not continue to establish the DVPN channel with the Hub, until the VAM server informs that the Hub is off line.

When the Spoke has established a DVPN channel with another Spoke, and receives a notification to remove the DVPN channel sent by the another Spoke, the current Spoke may remove the corresponding DVPN channel established.

After receiving the subnet information about the other Spoke and corresponding private network address of next hop, which are sent by the Hub, the Spoke may determine whether the Spoke has generated the subnet routing information about the Spoke. When determining that the Spoke has generated the subnet routing information about the Spoke, the Spoke may generate and update the subnet routing information, according to the received subnet information about the Spoke and corresponding private network address of next hop. Otherwise, the Spoke may generate the subnet routing information, according to the received subnet information about the Spoke and corresponding private network address of next hop. After receiving a notification to delete routing information corresponding to other Spoke sent by the Hub, the Spoke may delete corresponding routing information from the routing information generated by the Spoke.

When the Spoke has generated the subnet routing information about another Spoke, the identifier of which is newly transmitted by the Hub, it means that the subnet information about the another Spoke changes, which has already been informed by the Hub. When the Spoke previously doesn't generate the subnet routing information about another Spoke, the identifier of which is newly transmitted by the Hub, the another Spoke is a new Spoke online. When the networking type is Full-Mesh, the private network address of the next hop corresponding to the subnet information about other Spoke is a private network address of the other Spoke.

By adopting the DVPN larger-scale networking method and Spoke put forward by the present disclosure, flexibility about DVPN networking may be improved. System overheads and routing configuration about the Hub in the large-scale networking may also be reduced.

In the above method put forward by the present disclosure, the Spoke may establish a DVPN channel with a Hub, send subnet information about the Spoke to the Hub, and obtain subnet information about the Hub and another Spoke as well as corresponding private network address of next hop sent by the Hub. Thus, dependence on a dynamic routing protocol of the DVPN channel may be released. Flexibility about the DVPN networking may be improved. System overhead and routing configuration about the Hub in the large-scale networking may also be reduced.

In the following, how each VAM client obtains subnet information about other VAM client in the DVPN large-scale networking is described in detail, accompanying with figures and specific examples.

Figure 1:
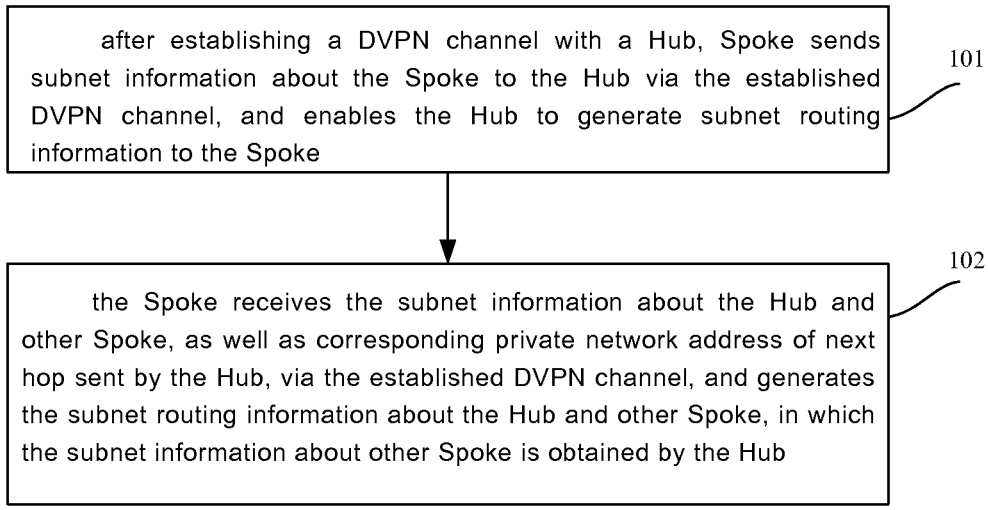
FIG. 1 is a flowchart illustrating DVPN large-scale networking, according to an example of the present disclosure.

With reference to FIG. 1, FIG. 1 is a flowchart illustrating DVPN large-scale networking, according to an example of the present disclosure. Specific blocks are as follows.

Block 101: after establishing a DVPN channel with a Hub, the Spoke sends subnet information of the Spoke to the Hub via the established DVPN channel, and enables the Hub to generate subnet routing information to the Spoke.

In the block, the Spoke can establish the DVPN channel with the Hub according to a conventional method. In specific implementations, when sending the subnet information of the Spoke to the Hub via the established DVPN channel, the Spoke may encapsulate information necessary to be sent into the packet, and enable the packet carrying necessary information to be forwarded via the established DVPN channel. Specific packet form and format may be configured according to specific applications.

The subnet routing information, which is generated by the Hub, includes subnet information about the Spoke and private network address of a next hop. In specific implementations, the Hub may record generated subnet routing about each Spoke in a static routing table, to facilitate updating and querying.

Block 102: the Spoke may receive the subnet information about the Hub and another Spoke, as well as corresponding private network address of next hop, which are sent by the Hub, via the established DVPN channel, and generate subnet routing information about the Hub and the other Spoke. The subnet information about the other Spoke is obtained by the Hub.

Specific contents about the subnet routing information of the Hub and other Spoke in the block are described in detail in the foregoing. Similarly, above subnet routing information may also be recorded in a static routing table generated by the Spoke, to facilitate querying and updating. After obtaining the subnet information and corresponding private network address of the next hop, how to generate the subnet routing information and how to record and store may employ existing technologies, which are not repeated here.

Figure 2:
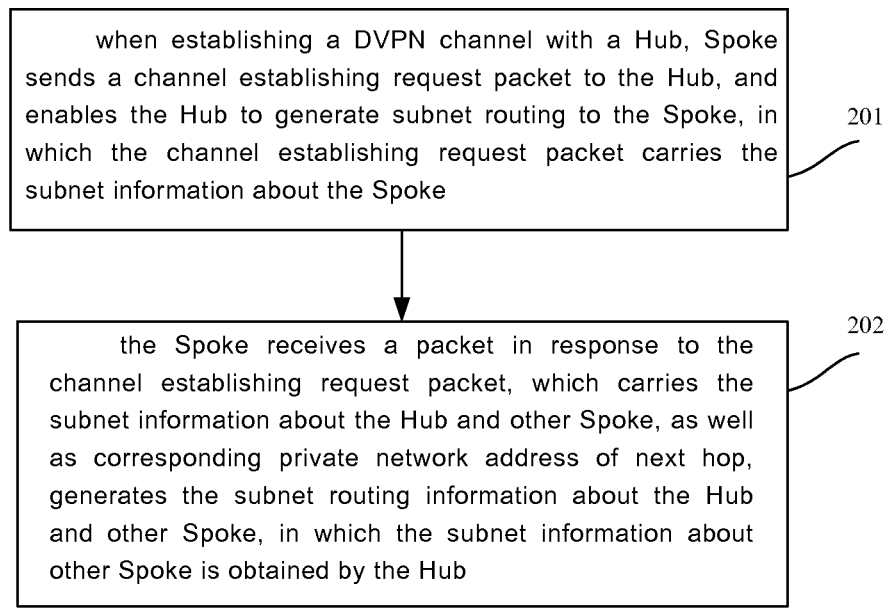
FIG. 2 is a flowchart illustrating the DVPN large-scale networking, according to another example of the present disclosure.

With reference to FIG. 2, FIG. 2 is a flowchart illustrating the DVPN large-scale networking, according to another example of the present disclosure. The specific blocks are as follows.

Block 201: when establishing a DVPN channel with a Hub, a channel establishing request packet sent by the Spoke to the Hub carries subnet information about the Spoke, to enable the Hub to generate subnet routing to the Spoke.

Block 202: the Spoke receives a packet in response to the channel establishing request packet, which carries subnet information about the Hub and another Spoke, as well as corresponding private network address of a next hop, which are sent by the Hub, and generates subnet routing information about the Hub and other Spoke. The subnet information about other Spoke is obtained by the Hub.

In the example, information necessary to be sent may be carried by a channel establishing request packet sent by the Spoke, and a packet in response to the channel establishing request packet, when the Spoke establishes the DVPN channel with the Hub.

In the above networking method, each Hub and each Spoke may obtain subnet address about other VAM client and corresponding private network address of next hop, and respectively generate subnet routing information to the peer end locally. After receiving a packet necessary to be sent to other VAM client, the local VAM client may search for the established DVPN channel, according to next hop address about subnet routing generated locally. When a corresponding DVPN channel has been established, the packet may be directly forwarded. When the corresponding DVPN channel has not been established, the private network address of a next hop is used as a next hop address to analyze the next hop address to the VAM server, in which the private network address of the next hop corresponds to the subnet information located by the destination address of the packet. A public network address of peer end is obtained, and a corresponding DVPN channel is established.

Figure 3:
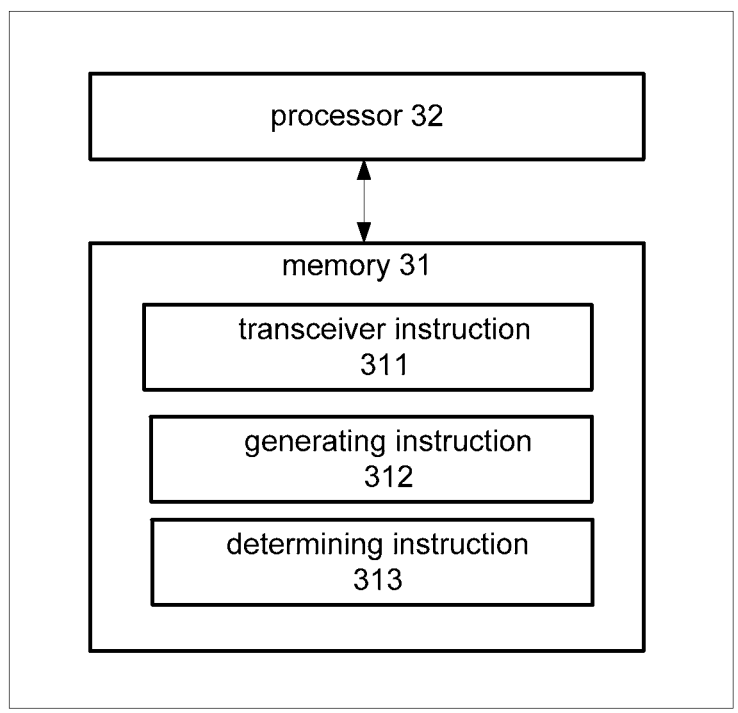
FIG. 3 is a block diagram illustrating structure of Spoke in the DVPN large-scale networking, according to an example of the present disclosure.

Based on the same idea, the present disclosure also provides a Spoke, which may be applied to the DVPN large-scale networking. In the network, each Hub and each Spoke may register to a VAM server. Subsequently, the VAM server may issue Hub information within a domain to each Spoke. With reference to FIG. 3, FIG. 3 is a block diagram illustrating structure of Spoke in the DVPN large-scale networking, according to an example of the present disclosure. The Spoke includes memory 31, and a processor 32 in communication with memory 31. Memory 31 stores transceiver instruction 311 and generating instruction 312, both of which are executable by processor 32.

Transceiver instruction 311 indicates to establish a DVPN channel with a corresponding Hub, according to the Hub information issued by the VAM server. Transceiver instruction 311 indicates to send subnet information about a Spoke located by memory 31 to the corresponding Hub, and to enable the corresponding Hub to generate subnet routing to the Spoke located by memory 31. Transceiver instruction 311 also indicates to receive subnet information about the Hub and another Spoke, as well as corresponding private network address of next hop, which are sent by the Hub, in which the subnet information about the other Spoke is obtained by the Hub.

Generating instruction 312 indicates to generate subnet routing information about the Hub and the other Spoke, according to the subnet information about the Hub and the other Spoke, as well as corresponding private network address of next hop sent by the Hub, which are received based on transceiver instruction 311. The subnet information about the other Spoke is obtained by the Hub.

After the DVPN channel has been established with the corresponding Hub, transceiver instruction 311 further indicates to send the subnet information about the Spoke located by memory 31 to the Hub via the established DVPN channel. Transceiver instruction 311 further indicates to receive the subnet information about the Hub and the other Spoke, as well as the corresponding private network address of next hop sent by the Hub via the DVPN channel. The subnet information about the other Spoke is obtained by the Hub.

When establishing the DVPN channel with the corresponding Hub, transceiver instruction 311 further indicates to send the channel establishing request packet to the Hub, in which the channel establishing request packet carries local subnet information. Transceiver instruction 311 further indicates to receive a packet in response to the channel establishing request packet sent by the Hub, which carries the subnet information about the Hub and the other Spoke as well as corresponding private network address of a next hop. The subnet information about the other Spoke is obtained by the Hub.

When the subnet information about the Spoke located by memory 31 changes, transceiver instruction 311 further indicates to inform the Hub about the subnet information changed via the DVPN channel, and enable the Hub to inform all of other Spokes, each of which has established a DVPN channel with the Hub, to change the subnet information about the Spoke. When the Spoke located by memory 31 is off line, transceiver instruction 311 indicates to inform the Hub, with which the DVPN channel is established, to remove corresponding DVPN channel, enable the Hub to delete corresponding routing information and to inform all of the other Spokes, each of which has established a DVPN channel with the Hub, to delete corresponding routing information.

When the Spoke located by memory 31 is off line, generating instruction 312 further indicates to delete routing information generated locally, and remove the DVPN channel established locally.

Transceiver instruction 311 further indicates to receive a notification to remove the DVPN channel sent by the Hub.

When the Spoke located by the memory 31 has established a DVPN channel with another Spoke, the subnet information about the Spoke located by the memory 31 changes, the transceiver instruction 311 further indicates to inform the Hub and the another Spoke with which a DVPN channel is respectively established, the changed subnet information via respective DVPN channel, enable the Hub to inform all of the other Spokes, each of which has established a DVPN channel with the Hub, to change the subnet information about the Spoke. When the Spoke located by the memory 31 is off line, the transceiver instruction 311 further indicates to inform the Hub and the another Spoke with which a DVPN channel is respectively established, to remove the corresponding DVPN channel, enable the Hub to delete corresponding routing information and to inform all of the other Spokes, each of which has established a DVPN channel with the Hub, to delete corresponding routing information;

When the Spoke located by the memory 31 has established a DVPN channel with another Spoke, the transceiver instruction 311 further indicates to receive a notification to remove the DVPN channel sent by the another Spoke.

After receiving the notification to remove the DVPN channel sent by the Hub according to transceiver instruction 311, generating instruction 312 further indicates to delete the routing information generated locally and the DVPN channel, and try again to establish a DVPN channel with the Hub, until the VAM server informs that the Hub is off line.

When the Spoke located by the memory 31 has established a DVPN channel with another Spoke, and after receiving the notification to remove the DVPN channel sent by the another Spoke according to transceiver instruction 311, generating instruction 312 indicates to remove corresponding DVPN channel established.

Memory 31 further stores determining instruction 313, which is executable by processor 32.

Transceiver instruction 311 further indicates to receive the subnet information about other Spoke and corresponding private network address of next hop sent by the Hub, receive a notification to delete corresponding routing information about other Spoke sent by the Hub.

When receiving the subnet information about other Spoke and corresponding private network address sent by the Hub, according to transceiver instruction 311, determining instruction 313 indicates to determine whether the subnet routing information about the Spoke has been generated according to generating instruction 312.

After determining the subnet routing information about the Spoke has been generated according to determining instruction 313, generating instruction 312 further indicates to generate and update the subnet routing information, according to the subnet information about the Spoke and corresponding private network address of next hop received based on transceiver instruction 311. Otherwise, generating instruction 312 indicates to generate the subnet routing information, according to the subnet information about the Spoke and corresponding private network address of a next hop received based on transceiver instruction 311. After receiving a notification to delete corresponding routing information about the other Spoke sent by the Hub according to transceiver instruction 311, generating instruction 312 indicates to delete corresponding routing information from the routing information generated locally.

When the networking type is Hub-Spoke, the private network address of next hop corresponding to the subnet information about the other Spoke is the private network address about the Hub.

When the networking type is Full-Mesh, the private network address of next hop corresponding to the subnet information about the other Spoke is the private network address of the other Spoke.

In view of above, in the technical solution of the present disclosure, after the DVPN channel is established between the Spoke and Hub, the Spoke may send the subnet information about the Spoke to the Hub, to obtain subnet information about the Hub and other Spoke as well as corresponding private network address of a next hop sent by the Hub, in which the subnet information about other Spoke is obtained by the Hub. Or, when establishing the DVPN channel, enable the channel establishing request packet to carry the subnet information about the Spoke, enable a packet in response to the channel establishing request packet to carry the subnet information about the Hub and the other Spoke, in which the subnet information about other Spoke is obtained by the Hub. Thus, dependence on the dynamic routing protocols about the DVPN channel may be released. Flexibility about the DVPN networking may be improved. System overheads and routing configuration about the Hub in the large-scale networking may be reduced.

What is claimed is:

1. A Dynamic Virtual Private Network (DVPN) large-scale networking method, wherein a Hub, and plurality of Spokes associated with the Hub and register to a Virtual Private Network (VPN) Address Management (VAM) server, and the VAM server issues Hub information within a domain to each Spoke, wherein the method comprises:
   registering, by the Spoke, with a VAM server that is separate from the Spoke and the Hub;
   obtaining, by the Spoke, Hub information from the VAM server;
   establishing, by the Spoke, a DVPN channel with the Hub over a public network, according to Hub information issued by the VAM server;
   sending, by the Spoke, local subnet information to the Hub, to enable the Hub to generate subnet routing to the Spoke;
   receiving, by the Spoke from the Hub, subnet information about the Hub and subnet information for another Spoke which is associated with the Hub, as well as a corresponding private network address of a next hop to the Spoke; and
   generating subnet routing information about the Hub and the another Spoke.

2. The method according to claim 1, comprising:
   after establishing the DVPN channel with the corresponding Hub, the sending includes sending the local subnet information to the Hub via the established DVPN channel; and
   the receiving includes receiving the subnet information and the subnet information for the another Spoke as well as the corresponding private network address of the next hop via the DVPN channel.

3. The method according to claim 1, wherein the establishing the DVPN channel comprises:
   sending, by the Spoke, a channel establishing request packet to the Hub, wherein the channel establishing request packet carries the local subnet information of the Spoke; and
   receiving, by the Spoke, a packet in response to the channel establishing request packet sent by the Hub, which carries the subnet information about the Hub and the subnet information for the another Spoke as well as the corresponding private network address of next hop.

4. The method according to claim 1, further comprising:
   when the subnet information about the Spoke changes, informing, by the Spoke, the Hub about the subnet information changed via the DVPN channel, and enabling the Hub to inform the another Spoke to change the subnet information about the Spoke;
   when the Spoke is off line, deleting, by the Spoke, routing information generated locally, informing the Hub with which the DVPN channel is established, to remove the corresponding DVPN channel, enabling the Hub to delete corresponding routing information and to inform the another Spoke to delete the corresponding routing information, and removing the DVPN channel established locally by the Spoke;
   wherein when the Spoke has established a DVPN channel with the another Spoke, the method further comprises:
   when the subnet information about the Spoke changes, informing, by the Spoke, the Hub and the another Spoke with which corresponding DVPN channel has established, about the subnet information changed via respective DVPN channel, and enabling the Hub to inform all other Spokes, each of which has established a DVPN channel with the Hub, to change the subnet information about the Spoke;
   when the Spoke is off line, deleting, by the Spoke, routing information generated locally, informing the Hub and the another Spoke with which the corresponding DVPN channel is established, to remove the corresponding DVPN channel, enabling the Hub to delete corresponding routing information and to inform all of the other Spokes to delete the corresponding routing information, and removing the DVPN channel established locally by the Spoke.

5. The method according to claim 1, further comprising:
   when receiving a notification to remove the DVPN channel sent by the Hub, deleting, by the Spoke, the routing information generated locally and the DVPN channel, and trying again to establish the DVPN channel with the Hub, until the VAM server informs that the Hub is off line;
   wherein when the Spoke has established a DVPN channel with the another Spoke, the method further comprises:
   when receiving a notification to remove the DVPN channel sent by the another Spoke, removing, by the Spoke, the corresponding DVPN channel established.

6. The method according to claim 1, further comprising:
   after receiving the subnet information about the another Spoke and corresponding private network address of next hop sent by the Hub, determining, by the Spoke, whether the subnet routing information about the another Spoke has been generated locally;
   if the subnet routing information about the another Spoke has been generated locally, generating and updating, by the Spoke, the subnet routing information, according to the received subnet information about the another Spoke as well as the corresponding private network address of next hop;
   if the subnet routing information about the another Spoke has not been generated locally, generating, by the Spoke, the subnet routing information, according to the received subnet information about the another Spoke and the corresponding private network address of next hop; and
   when receiving a notification to delete routing information corresponding to another Spoke sent by the Hub, deleting, by the Spoke, the corresponding routing information from the routing information generated locally.

7. The method according to claim 1, wherein
   when networking type is Hub-Spoke, the private network address of the next hop is a private network address of the Hub; and
   when the networking type is Full-Mesh, the private network address of the next hop is a private network address of the another Spoke.

8. A Spoke comprising a processor and a memory storing subnet information about the Spoke and machine readable instructions which are executable by the processor to:
   establish a Dynamic Virtual Private Network (DVPN) channel with a Hub of the DVPN, according to Hub information issued by a Virtual Private Network Address Management (VAM) server which is separate from the Hub, and send the subnet information about the Spoke stored in the memory to the Hub so as to enable the Hub to generate a subnet routing to the Spoke;
   receive, from the Hub, subnet information about the Hub and subnet information about another Spoke which is associated with the Hub, as well as a corresponding private network address of a next hop to the another Spoke; and generate subnet routing information about the Hub and the another Spoke, according to the received subnet information about the Hub and the another Spoke as well as the corresponding private network address of the next hop sent by the Hub;

in response to receiving a notification to remove the DVPN channel sent by the Hub, delete the subnet routing information generated locally and the DVPN channel, and try again to establish a DVPN channel with the Hub, until the VAM server informs the Spoke that the Hub is off line; and in response to receiving a notification to remove a DVPN channel with the another Spoke, delete the DVPN channel with the another Spoke.

9. The Spoke according to claim 8, wherein the instructions include instructions to:

send the subnet information about the Spoke located by the memory to the Hub via the established DVPN channel, after the DVPN channel is established with the corresponding Hub, receive the subnet information about the Hub and the another Spoke, as well as corresponding private network address of a next hop sent by the Hub via the DVPN channel, wherein the subnet information about the another Spoke is obtained by the Hub.

10. The Spoke according to claim 8, wherein the instructions include instructions to:

enable a channel establishing request packet destined for the Hub to carry local subnet information, when establishing the DVPN channel with the Hub, receive a packet in response to the channel establishing request packet, which carries the subnet information about the Hub and another Spoke as well as corresponding private network address of next hop sent by the Hub, wherein the subnet information about the another Spoke is obtained by the Hub.

11. The Spoke according to claim 8, wherein the instructions include instructions to:

inform the Hub the changed subnet information via the DVPN channel, when the subnet information about the Spoke located by the memory changes, and enable the Hub to inform another Spoke to change the subnet information about the Spoke;

when the Spoke located by the memory is off line, inform the Hub with which the DVPN channel is established, to remove the corresponding DVPN channel, enable the Hub to delete corresponding routing information, and inform the another Spoke to delete corresponding routing information; and when the Spoke located by the memory has established a DVPN channel with another Spoke, the subnet information about the Spoke located by the memory changes, inform the Hub and the another Spoke, with which the corresponding DVPN channel is established, the changed subnet information via respective DVPN channel, enable the Hub to inform all of other Spokes, each of which has established a DVPN channel with the Hub, to change the subnet information about the Spoke;

when the Spoke located by the memory is off line, inform the Hub and the another Spoke, with which the corresponding DVPN channel is established, to remove the corresponding DVPN channel, enable the Hub to delete corresponding routing information and to inform all of the other Spokes to delete corresponding routing information; and delete the routing information generated locally, and remove the DVPN channel established locally, when the Spoke located by the memory is off line.

12. The Spoke according to claim 8, wherein the memory further stores instructions executable by the processor to:

after receiving the subnet information about the another Spoke and corresponding private network address of next hop sent by the Hub, determine, by the Spoke, whether the subnet routing information about the another Spoke has been generated locally;

if the subnet routing information about the another Spoke has been generated locally, generate and update, by the Spoke, the subnet routing information, according to the received subnet information about the another Spoke as well as the corresponding private network address of next hop;

if the subnet routing information about the another Spoke has not been generated locally, generate, by the Spoke, the subnet routing information, according to the received subnet information about the another Spoke and the corresponding private network address of next hop; and in response to receiving a notification to delete routing information corresponding to another Spoke sent by the Hub, delete, by the Spoke, the corresponding routing information from the routing information generated locally.

13. The Spoke according claim 8, wherein if networking type is Hub-Spoke, the private network address of the next hop is a private network address of the Hub; and if the networking type is Full-Mesh, the private network address of the next hop is a private network address of another Spoke.

* * * * *